May 20, 1958     W. W. YORK ET AL     2,835,270
AUTOMATIC POULTRY WATERER
Filed Jan. 27, 1956

INVENTORS
WILLIAM W. YORK
LEE R. YORK
BY
McMorrow, Berman + Davidson
ATTORNEYS

2,835,270
AUTOMATIC POULTRY WATERER

William W. York and Lee R. York, Clyde, Tex.

Application January 27, 1956, Serial No. 561,716

2 Claims. (Cl. 137—412)

This invention relates generally to liquid level control systems and a primary object of invention is to provide a float controlled switch and solenoid valve assembly controlling a stabilized flow of pressure liquid in a pilot tank whereby a remote liquid container such as a poultry watering trough may have maintained therein a predetermined liquid level without contaminating the control mechanism of the pilot tank.

A more specific object of invention in conformance with that set forth above is to provide a pilot tank including liquid inlet and outlet conduits in communication with a container in which a predetermined liquid level is to be maintained, said pilot tank including float means operatively connected to force transmitting means operatively connected to spring biased switch means for controlling a solenoid actuated spring biased liquid control valve whereby the flow of liquid into the pilot tank is maintained, said pilot tank including liquid stabilizing means for minimizing the turbulence of liquid entering the pilot tank.

A further object of invention in conformance with that set forth is to provide a pilot control tank of the character set forth which is readily manufactured, installed and maintained, and highly practical and efficient for the purpose intended.

Figure 1:
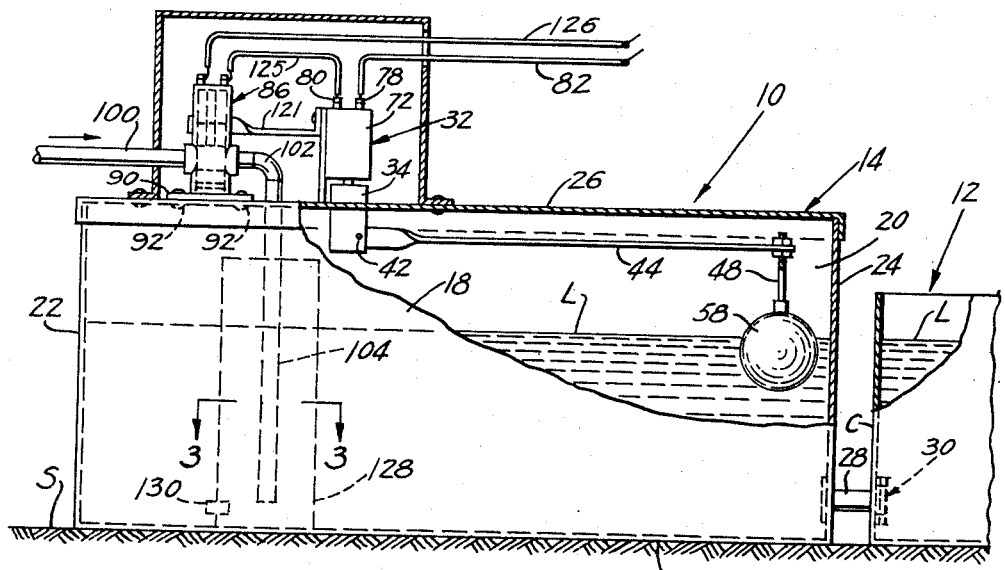
Figure 2:
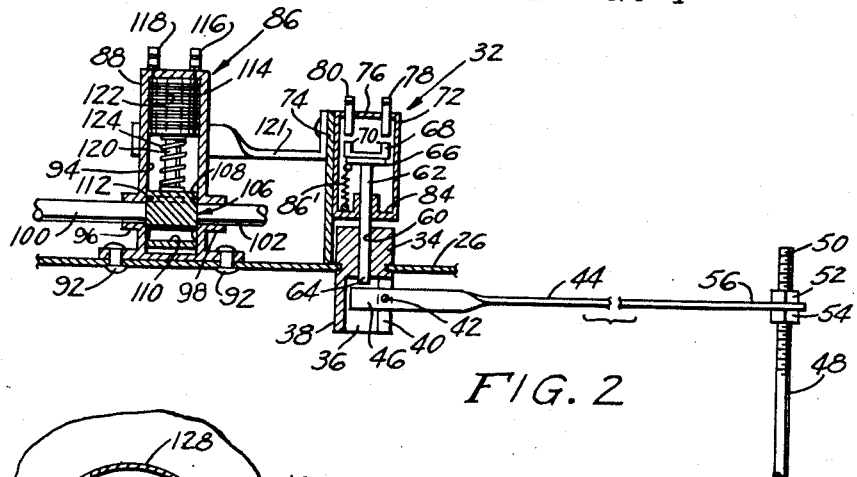
Figure 3:
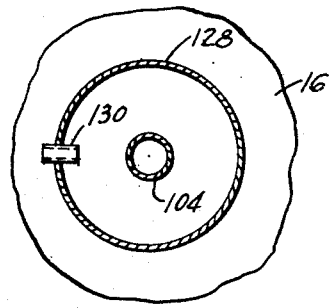

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing diagrammatically the pilot control tank and communicating container in which a predetermined level of liquid is to be maintained, parts being broken away and shown in section for clarity;

Figure 2 is an enlarged fragmentary diagrammatic view with portions broken away and shown in section for clarity, showing the force transmitting means in conjunction with the switch assembly and solenoid controlled valve assembly of the invention; and Figure 3 is an enlarged sectional view taken substantially on line 3—3 of Figure 1 showing a detail of the stabilizing container contained in the pilot tank.

Referring to the drawings, a control or pilot tank assembly is indicated generally at 10 and a container in which a predetermined level of liquid is to be maintained is indicated generally at 12. It is to be understood that the pilot tank assembly 10 and the container 12 are supported on substantially the same level which is the ground surface S, and thus a level of liquid L in the pilot tank will be the same as that in the container in which the level is to be maintained.

The pilot tank assembly 10 includes a pilot tank member 14 which incorporates a bottom member 16, side walls 18 and 20, end walls 22 and 24, the end and side walls having over their upper edges a suitable top wall or cover member 26. It is to be understood that the tank member 14 is substantially closed thus preventing foreign matter from entering said tank and contaminating the control mechanism therein. It will be observed from the subsequent description that the control mechanism of the pilot tank member may be removed in toto for the purposes of maintenance, inspection or repair.

Included in the end wall 24 of the tank member 14 below the predetermined level of liquid is a communicating conduit 28 which communicates with the interior of the container C, a suitable strainer assembly indicated generally at 30 being interposed between the conduit 28 and the interior of the container C. The aforementioned strainer assembly prevents foreign matter from entering the interior or pilot chamber of the pilot tank member 14 through the conduit 28.

Indicated generally at 32 is a fluid responsive control switch including a lower housing portion 34 suitably secured to the top member 26, see Figure 2, said housing member 34 having a lower bore recess portion 36 formed by an annular side wall portion 38, said side wall portion having extending therethrough a longitudinally extending slot portion 40. Extending transversely across the slot portion 40 is a pivot pin element 42 defining a horizontal pivot axis portion on the housing member 34, said pivot pin element 42 having pivotally mounted thereon an intermediate portion of a force transmitting lever 44. The lever 44 has a terminal end portion 46 extending into the bore or chamber member 36 of the body member 34, and has secured at its other end in a suitable aperture portion a float rod element 48 which has an upper threaded end 50 upon which are disposed a pair of adjusting nut elements 52 and 54 disposed on opposite sides of the end 56 of the lever 44. The rod 48 has secured at its lower end a suitable hollow float ball 58 which floats on the liquid level L, and when the ball rises or falls with said liquid level there is a resulting lowering or raising of the end 46 of the force transmitting lever 44.

The housing member 34 includes and in longitudinal alignment with the bore chamber portion 36 a communicating bore portion 60 which has reciprocably disposed therein a plunger element or rod member 62 which has an end portion 64 overlying the end 46 of the force transmitting lever, and which has secured on the other end an insulating element 66 which carries thereon an electrical contact element 68 having a pair of spaced electrical contact portions 70. The upper end of the rod 62, the insulating element 66 and the electrical contact element 68 are disposed within a housing member 72 which is suitably supported from the top portion 26 of the pilot chamber member which has an internal chamber portion for accommodating the previously mentioned parts. The housing member 72 may be supported from the top of the pilot chamber member by means of a suitable bracket element 74. Extending into the upper portion 76 of the housing 72 are a pair of electrical terminals 78 and 80, the terminal 78 being connected to an electrical conducting wire 82 which is suitably connected to one side of a source of electric current (not shown). Extending between a lower portion of element 66 and the bottom portion 84 of the housing member 72 is a tension spring element 86 which biases the contact element 68 and rod 62 downwardly toward the end 46 of the force transmitting lever, vertical pivotal movement in a clockwise direction of the previously mentioned end 46 of said lever, resulting in engagement with the end 64 of the rod 62 and urging the contact portions 70 upwardly for engagement with the respective terminals, each of which being engageable with one of the overlying terminals 78 and 80. Thus, such engagement will close a circuit from a source of potential and be operative for activating a solenoid controlled valve assembly indicated generally at 86.

As most clearly seen in Figure 2, the solenoid controlled valve assembly includes a body member 88 having a lower mounting flange portion 90 which is suitably secured to the top member 26, by means of fastening elements 92, for example, said body member 88 having an internal bore or chamber portion 94. The body member 88 has extending transversely therefrom diametrically opposed transverse liquid conduit portions 96 and 98 suitably connected to a fluid pressure liquid inlet line 100 and outlet line 102, respectively, said line 102 terminating in a downwardly directed outlet portion 104 extending into the pilot chamber of member 14 and terminating in overlying relationship to the bottom 16 thereof.

Reciprocably supported in the bore or chamber portion 94 of the body member 88 is a valve element 106 which has a body portion 108 normally preventing communication between the conduits 100 and 102, and having a transverse bore 110 extending therethrough, said bore 110 providing communication between the conduits 100 and 102 when the valve element 106 is raised upwardly as viewed in Figure 2. The valve element 106 may have disposed about the outer periphery a conventional sealing element 112, such as an O-ring.

The previously mentioned seal 112 prevents liquid from communicating with the upper portion of the bore 94 deterring the possibility of grounding out a solenoid coil 114 contained therein, said solenoid coil having opposite end portions suitably connected to terminals 116 and 118 suitably secured and mounted on the body member 88. Extending vertically from the valve element 106 is a solenoid rod 120 which is reciprocably disposed in a central aperture portion 122 of the solenoid coil 114, said rod 120 having circumposed thereabout a compression spring element 124 which is interposed between the coil 114 in an upper portion of the valve element 106 thus normally urging the valve element 106 and the portion 108 thereof into a conduit closing relationship with respect to the conduits 100 and 102.

In order to provide rigidity to the device, a suitable bracket assembly 121 may be suitably secured between the body member 88 and housing member 72 as clearly seen in Figure 2.

The terminal 80 of the switch assembly 32 is connected by means of an electrical conducting wire 125 to the terminal 116, the terminal 118 being connected by means of a suitable electrical conducting wire 126 to the other side of the source of electrical current, which might be a battery or any other suitable means.

Thus, when the force transmitting lever 44 oscillates about the pivot element 42 as previously mentioned, such movement will be effective to overcome the tension spring 86' closing the circuit between the electrical conducting wires 126 and 82 actuating the solenoid coil 114 thereby urging the solenoid rod 120 up into the bore portion 122 of the solenoid coil whereby pressure liquid is permitted to pass through the conduit 100 into the conduit 102 and thence into the pilot chamber member 14.

In order to prevent turbulence within the pilot chamber member there is provided a vertically extending closed container 128 which includes a lower outlet aperture portion 130, said outlet portion being disposed at a lower portion of the chamber member below the predetermined level L and thus water, the liquid entering the container 128 will flow gradually from the container 128, aperture portion 130 being of a smaller diameter than 104, without materially effecting the float 58 of the device and prematurely actuating the control mechanism.

From the foregoing the operation and use of the device is believed readily apparent, it being understood that the pilot control chamber assembly or tank 10 may be utilized wherever a level similar to that contained therein is desired in a remote container, trough, etc.

Various positional directional terms such as "front," "top," etc. are utilized herein to have only a relative connotation to aid in describing the device and is not intended to require any particular orientation with respect to any external elements.

The foregoing is considered illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:

1. An automatic liquid level control pilot tank for use in systems including a remote container in which liquid level is to be kept constant comprising a closed tank member, a liquid outlet portion in said tank member adjacent a bottom portion thereof and adapted to deliver liquid into the remote container at a level below that to be maintained in the remote container, a solenoid controlled valve assembly on said tank member, a pressure liquid inlet line in communication with the solenoid controlled valve assembly, a second liquid line in communication with said solenoid controlled valve assembly, said solenoid valve assembly controlling flow between the liquid lines, the interior of the tank member defining a constant level pilot chamber, the second liquid line terminating in said pilot chamber, liquid stabilizing means in communication with the second liquid line for preventing turbulence within the pilot chamber, float means disposed in the pilot chamber for movement with the liquid level in the pilot chamber, a float responsive switch assembly on the tank member, force transmitting means extending between the float means and switch assembly for activating and deactivating the switch assembly, and electrical conducting means between the switch and solenoid valve assemblies for transmitting current to the solenoid valve assembly and activating solenoid valve in response to a fall of the float means below a predetermined level in the pilot chamber, the float means comprising a hollow floatable ball element in the pilot chamber, the force transmitting means comprising an elongated lever member having one end portion secured to the floatable ball element, the float responsive switch assembly including a housing member extending into the pilot chamber, said housing member including a horizontal pivot axis portion, the lever member having an intermediate portion pivotally connected to the pivot axis portion and a terminal end portion in the housing member, rising and falling of the floatable ball element resulting in corresponding oscilating movement of the terminal end portion of the lever member, a plunger element slidably extending through the housing member and including an end portion engageable with the terminal end portion of the lever member, spaced electrical contact means in the housing member for engagement by an upward movement of the plunger element, and spring biasing means extending between the plunger element and housing member for breaking a circuit between the electrical contact means upon a predetermined downward movement of the plunger element.

2. An automatic liquid level control pilot tank for use in systems including a remote container in which liquid level is to be kept constant comprising a closed tank member, a liquid outlet portion in said tank member adjacent a bottom portion thereof and adapted to deliver liquid into the remote container at a level below that to be maintained in the remote container, a solenoid controlled valve assembly on said tank member, a pressure liquid inlet line in communication with the solenoid controlled valve assembly, a second liquid line in communication with said solenoid controlled valve assembly, said solenoid valve assembly controlling flow between the liquid lines, the interior of the tank member defining a constant level pilot chamber, the second liquid line terminating in said pilot chamber, liquid stabilizing means in communication with the second liquid line for preventing turbulence within the pilot chamber, float means disposed in the pilot chamber for movement with the liquid level in the pilot chamber, a float responsive switch assembly on the tank member, force transmitting means extending between the float means and switch assembly for activating and deactivating the switch assembly, and electrical conducting means between the switch and solenoid valve assemblies for transmitting current to the solenoid valve assembly and activating solenoid valve in response to a fall of the float means below a predetermined level in the pilot chamber, the float means comprising a hollow floatable ball element in the pilot chamber, the force transmitting means comprising an elongated lever member having one end portion secured to the floatable ball element, the float responsive switch assembly including a housing member extending into the pilot chamber, said housing member including a horizontal pivot axis portion, the lever member having an intermediate portion pivotally connected to the pivot axis portion and a terminal end portion in the housing member, rising and falling of the floatable ball element resulting in corresponding oscillating movement of the terminal end portion of the lever member, a plunger element slidably extending through the housing member and including an end portion engageable with the terminal end portion of the lever member, spaced electrical contact means in the housing member for engagement by an upward movement of the plunger element, and spring biasing means extending between the plunger element and housing member for breaking a circuit between the electrical contact means upon a predetermined downward movement of the plunger element, the solenoid controlled valve means comprising a body member having an internal bore portion, oppositely disposed transverse liquid conduit portions in communications with said bore portion, a reciprocable valve element having a valve portion normally preventing communication between the transverse liquid conduit portions, spring biasing means in the body member in engagement with the valve element for urging the valve portion of the valve element into a closing relationship with the liquid conduit portions, transverse bore portion extending through the valve element permitting communication between the liquid conduit portions, an integral solenoid rod extending from the valve element, a solenoid coil in the body member in circumposed relationship to the solenoid rod, electrical current flow in the solenoid coil from the switch assembly moving said solenoid rod and valve element upwardly permitting communication between the liquid conduits of the body member.

References Cited in the file of this patent

UNITED STATES PATENTS

| | | |
|---|---|---|
| 465,212 | Schilling | Dec. 15, 1891 |
| 1,174,345 | Plett | Mar. 7, 1916 |
| 1,179,537 | Mapel | Apr. 18, 1916 |
| 1,778,198 | Metcalfe | Oct. 14, 1930 |